FIG_1

Oct. 12, 1965 P. R. BUNNELLE 3,210,940
VARIABLE SPEED COUPLING
Filed March 11, 1963 9 Sheets-Sheet 5

INVENTOR
PHILIP R. BUNNELLE
BY *Hans G. Hoffmeister*
ATTORNEY

Oct. 12, 1965  P. R. BUNNELLE  3,210,940
VARIABLE SPEED COUPLING
Filed March 11, 1963  9 Sheets-Sheet 6

INVENTOR
PHILIP R. BUNNELLE
BY Hans F. Hoffmeister
ATTORNEY

FIG_19

FIG_20

FIG_21

United States Patent Office 3,210,940
Patented Oct. 12, 1965

3,210,940
VARIABLE SPEED COUPLING
Philip R. Bunnelle, Santa Clara, Calif., assignor to FMC Corporation, San Jose, Calif., a corporation of Delaware
Filed Mar. 11, 1963, Ser. No. 264,422
17 Claims. (Cl. 60—54)

This invention relates to fluid couplings, and more specifically to what are known as variable fill fluid couplings. In fluid couplings of this type, liquid constantly bleeds from the working chamber of the coupling, and charging liquid is constantly added to the working chamber of the coupling. Either the rate of bleeding of liquid from the working chamber of the coupling, or the rate of filling or charging the coupling can be varied, the result being that the level of fill in the working chamber of the coupling becomes stabilized at a percent fill which determines the speed of the runner or driven element of the coupling under a given load.

In the coupling of the present invention, the bleed orifices from the working chamber are fixed, and the rate of filling or charging of the working chamber is varied, to determine the level or percent fill of the coupling. This, in turn, determines the degree of slip of the runner relative to the impeller, and in the case of the present invention, since the impeller is driven at constant speed, the aforesaid variation in charging rate determines the speed of the runner, and hence the output shaft of the coupling.

Variable fill couplings of the type of which the present invention relates are particularly useful for driving pumps, generally centrifugal pumps. Such pumps may serve as booster pumps in apartment houses and other buildings, and may find applications in municipal water systems and in commercial and industrial processes. They may be employed as an auxiliary booster where available water pressure is not always sufficient to meet the demand. Such couplings can also be used to provide a constant speed output from a variable speed input, using controls known in the art.

Briefly, in accordance with the present invention the working chamber of the coupling is charged from a constant displacement pump, which is driven from the impeller shaft, and supplies the charging liquid from a source such as the sump of the coupling. A relatively movable charging nozzle or orifice means and a charging stream splitter assembly is provided, which parts determine the proportion of the charging liquid that enters the working chamber of the coupling with the balance of the charging liquid being bypassed, or returned to the sump. Suitable control means are provided to determine the relative position of the nozzle or orifice means and the charging liquid divider or splitter assembly parts.

It is an object of the present invention to provide a variable fill coupling of the type described which is particularly adapted to automatic control.

Another object is to provide a variable fill coupling of the type described which is especially suitable for driving centrifugal pumps, and for maintaining the discharge pressure of such pumps constant.

A further object of the invention is to provide a variable fill coupling that minimizes the steady state pressure differences at various discharge rates, in response to the control.

Another object of the invention is to provide simple means for adjusting the sensitivity of the response of the coupling charging means to operation of the control.

A further object of the present invention is to provide a variable fill coupling which will respond rapidly to change in demand, as evidenced by motion of the control unit, but which will have a minimum of overshoot and will not hunt. It is a characteristic of the charging liquid splitting means referred to, that the correction of the difference or error is rapid when the error is great, and decreases as the error is reduced.

An object of a modified form of the invention is to provide a control system for variable fill couplings which can be formed to provide a variable rate response to a given error or signal situation from the control unit.

An object of a modified form of the invention is to provide a control which renders correction of the error more rapid in one direction than in the other.

An object of another modified form of the present invention is to provide a variable fill coupling wherein the correction rate is variable at different levels of fill.

The manner in which these and other objects are accomplished by the present invention will be apparent to one skilled in the art from the following detailed description of the invention.

Figure 1:
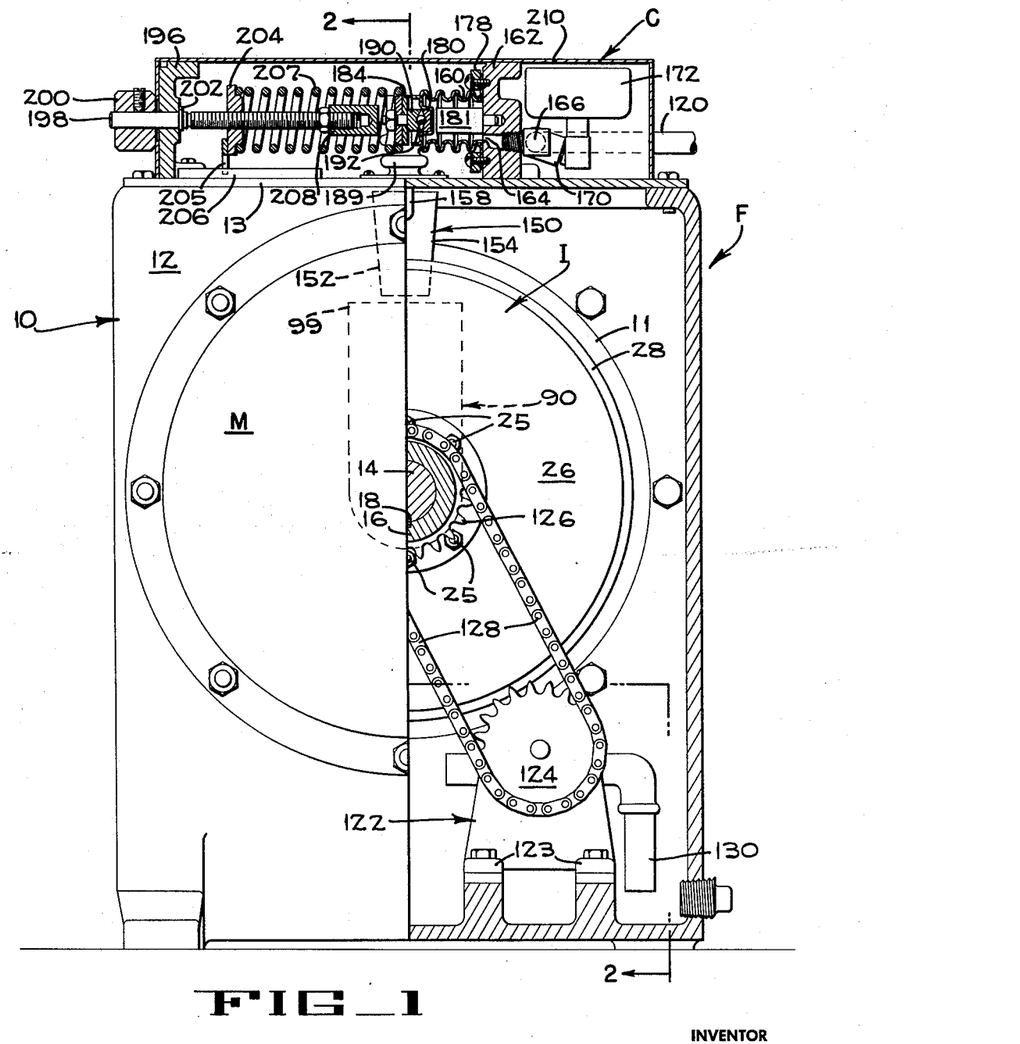
FIGURE 1 is an end elevation of a coupling with parts of the housing end plate broken away.
Figure 2:
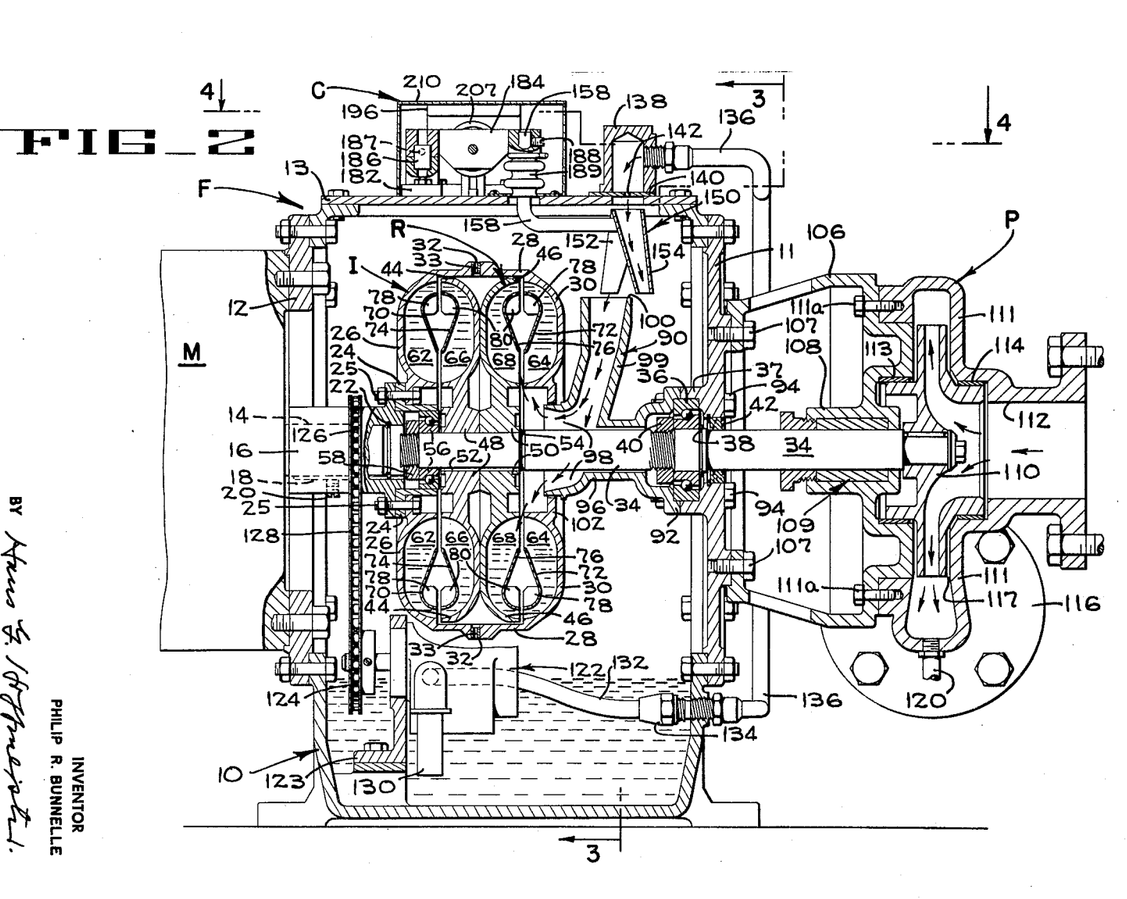
FIGURE 2 is a section taken on lines 2—2 of FIGURE 1.
Figure 3:
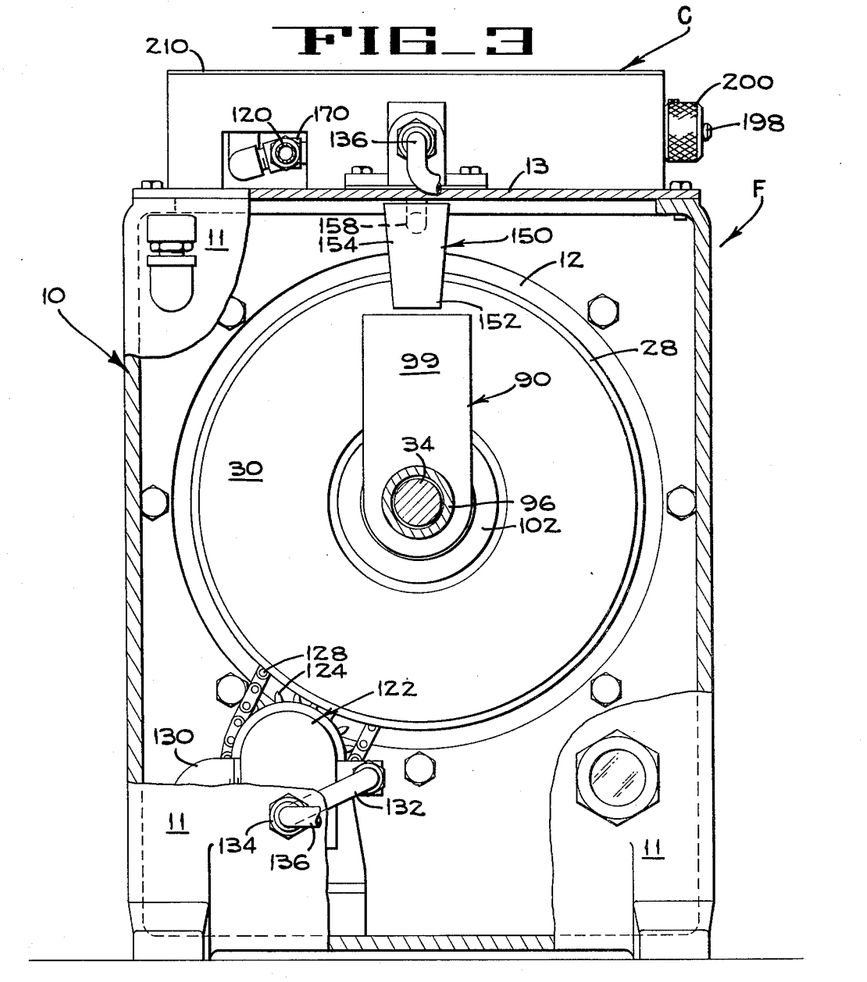
FIGURE 3 is a section taken on lines 3—3 of FIGURE 2.

One form of coupling embodying the invention is shown in FIGURES 1–6. FIGURE 2 shows a complete system, including means for driving the fluid coupling of the present invention, and a centrifugal pump driven by the coupling. The fluid coupling of the present invention is indicated generally at F, and as illustrated, it is driven by an electric motor M. The fluid coupling drives a centrifugal pump P, and the fill level of the coupling, and hence the output of the centifugal pump P, is determined by a control unit C.

*Fluid coupling construction.*—Referring primarily to FIGURES 1–4, the fluid coupling F is provided with a housing indicated generally at 10, and a pump mounting plate 11 forms one end of the housing. A drive motor mounting plate 12 forms the opposite end of the housing for mounting the motor M, and a cover plate 13 is secured to the top of the housing. In order to drive the fluid coupling, the shaft 14 of the drive motor M is keyed to a hub 16, FIGURE 2, by means of a key 18, which is retained by a set screw 20. Mounted within the bore of hub 16 is a thrust bearing snap ring 22.

Bolted to the axially inner face of the hub 16 is a bearing quill 24. The impeller I of the fluid coupling is assembled with the bearing quill 24, and with the hub 16 by means of bolts 25.

In the form of the invention being described, the fluid coupling is of the dual or double runner and impeller type. Thus the impeller I has a first driving section 26, from which extends a peripheral shroud 28, and the shroud mounts a second driving section 30 of the impeller. Means are provided to constantly bleed liquid from the working chamber bounded by the shroud in the form of removable bleed orifice screws 32. These screws are provided with metered bores 33, as seen in FIGURE 2, and are removable to facilitate selection of the desired bleeding rate from the working chamber of the coupling.

Also mounted within the working chamber of the coupling is a runner R, which is supported by the fluid coupling drive shaft 34. This drive shaft is mounted in the pump mounting plate 11 by a combined radial and thrust ball bearing 36. The outer race of the bearing 36 fits within a bearing seat 37, that projects inwardly from the housing plate 11. The inner race of the bearing 36 is axially located on the coupling output shaft 34 between a snap ring 38, and a shaft mounted lock nut 40. A dirt seal 42 is provided between the plate 11 and the drive shaft 34.

The double runner R is formed in two sections. There is a first driven section 44 and a second driven section 46. These runner sections have hubs 48, 50 respectively, which as stated, are mounted on the coupling output or drive shaft 34. The runner hubs are keyed to the drive shaft 34 by means of a key 52. The hubs are axially located on shaft 34 in one direction by a shaft snap ring 54. Adjacent the end of the coupling drive shaft 34 is another combined radial and thrust ball bearing 56, the outer race of which is mounted within the bearing quill 24, previously described. A lock nut 58 screwed onto the end of the drive shaft 34 clamps the runner sections 44 and 46 against the snap ring 54 previously referred to.

The impeller I is provided with blades 62 on section 26 and blades 64 on section 30. Similarly the runner R is provided with blades 66 on the runner section 44 that cooperates with the blades 62 of the impeller, and the section 46 of the runner is provided with blades 68 that cooperate with blades 64 of the impeller.

In order to improve the linearity of the response of the coupling to variations in level of fill at low levels of fill, impeller section 26 of the impeller I is provided with annular inner guide 70, and section 30 of the impeller is provided with an annular inner guide 72. Cooperating annular guides 74 and 76 are provided on sections 44 and 46 of the runner R, respectively. The annular guides 70 and 72 of the impeller are provided with small auxiliary blades 78, which cooperate with companion auxiliary blades 80 on the annular guides 74 and 76 of the runner. Further reference to the function of these guides and auxiliary blades will be made during the description of the operation of the coupling.

The inner guides produce higher efficiencies at full couple by reducing turbulence. The inner guides are actually a detriment to good linearity of response at lower levels of fill (below 30% in this example) and the auxiliary blades 78, 80 compensate for this.

At levels to fill above 30%, the inner guides improve linearity, so that the combination of inner guides and auxiliary vanes produce better linearity than can be achieved with an open coupling.

Figures 5, 6:
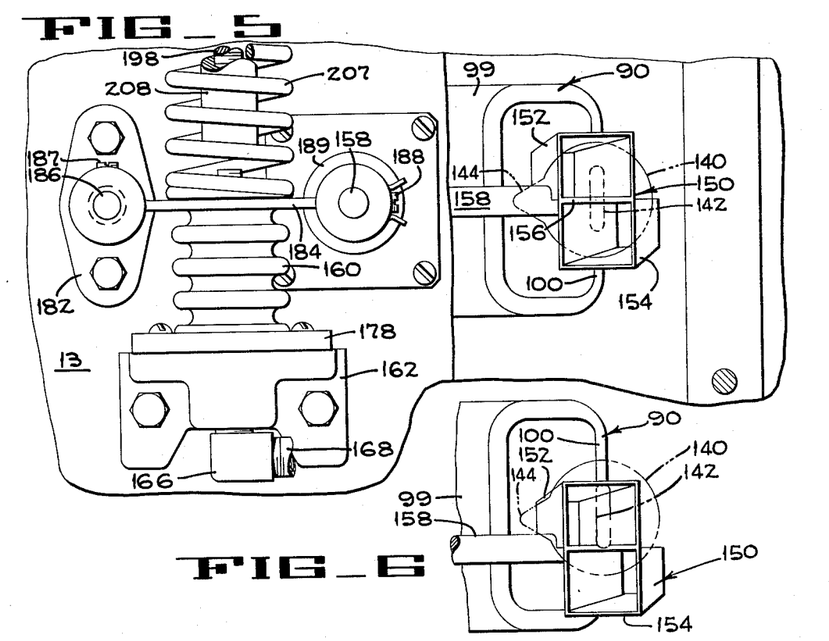
FIGURE 5 is a plan showing the relation of the charging fluid orifice to the splitter at the charging chute.
FIGURE 6 is a plan of the charging chute and splitter, with the splitter moved to its maximum charging position.

In order to provide for charging the working chamber of the coupling with liquid by the control system, a charging port means in the form of a charging chute 90 is provided. In the embodiment of the invention being described, this chute is fixed within the coupling housing and is mounted on the pump side plate 11 by means of a combined mounting flange and bearing locating flange 92. Flange 92 is fastened to the centrifugal pump mounting plate 11 by bolts 94. Extended inwardly from the charging port mounting flange 92, and closely surrounding the coupling output or drive shaft 34, is a charging chute support sleeve 96. The internal diameter of this sleeve is progressively increased as it approaches the outer impeller section 30, to provide a charging chute delivery mouth 98. Extending upwardly from the delivery mouth 98, is a charging chute delivery port or conduit 99. As best seen in FIGS. 2, 5 and 6, one side of the charging chute delivery port 99 is precisely machined to provide a blunt knife edge 100. It will be noted that the charging chute delivery mouth 98 extends into and closely fits a hub portion 102 of the outer impeller section 30. This construction causes charging liquid that is delivered to the charging port 99 to be picked up and carried by centrifugal force radially outwardly between section 46 of the runner and section 30 of the impeller, and hence into the working chamber of the coupling. Thus it can be seen that means are provided for admitting charging liquid to the working chamber of the coupling in the form of a charging chute or port, and means are provided for constantly bleeding the liquid from the working chamber by means of a bleed orifice screw 32.

*The centrifugal pump.*—As previously mentioned, the coupling of the present invention is illustrated and described as employed for driving a centrifugal pump, such as a water pump. Although details of the pump form no part of the present invention, a typical centrifugal pump construction appears in FIGURE 2. The centrifugal pump P has a housing portion 106 that is bolted to the plate 11 of the coupling housing, by means of bolts 107. The housing portion 106 has a hub 108 that surrounds the pump output or drive shaft 34, and the hub 108 of the pump housing is sealed against the shaft 34 by a gland type packing assembly 109, of conventional construction. The centrifugal pump P is provided with an impeller 110 which is mounted on the outer end of the coupling output or drive shaft 34. The impeller vane fits within a chamber portion 111 of the pump housing, which housing portion is bolted to the housing portion 106 previously described by bolts 111a. The chamber portion 111 of the pump housing has an axially projecting intake port or mouth 112, that is flanged for connection to the liquid intake pipe for the pump. The pump impeller 110 is radially supported within the assembled housing portions 106 and 11 by replaceable wear rings 113 and 114, respectively. Discharge of the liquid from the housing is by way of a discharge fitting 116, having a throat 117 which leads from the lower portion of the chamber or volute portion 111 of the pump housing.

In the installation being described, and as will be explained in detail presently, control of the charging rate to the working chamber of the fluid coupling is provided in response to the pressure developed within the chamber portion 111 of the centrifugal pump housing. This pressure is communicated to the control system by a control line 120, the inlet end of which is connected to the chamber portion 111 of the centrifugal pump P. The other end of control line 120 is connected to the control unit C, in a manner to be described when the control unit is described in detail.

*Coupling charging system.*—In the form of the invention being described, the charging liquid introduced into the working chamber of the coupling is withdrawn from the sump of the coupling housing by a continuous delivery charging pump 122. The charging pump 122 is mounted within the sump of the coupling housing by means of mounting feet 123, FIGURES 1 and 2, that are bolted to the base portion of the coupling housing. The charging pump 122 is provided with an inlet pipe 130, that is always below the level of the liquid within the coupling sump in normal operation. The charging pump is driven by a pump sprocket 124, a driving sprocket 126 on hub 16 of the impeller, and a chain 128. By way of example only, a 10½ inch diameter fluid coupling driven at 1750 r.p.m. could handle a horsepower range of 10 to 25 H.P. and could be charged by a 5 g.p.m. charging pump 122.

If the motor M is of the conventional squirrel cage A.C. type, and has adequate power, the motor speed of 1750 r.p.m. remains substantially constant up to the stall point, so that the charging pump 122 will deliver charging liquid at a substantially continuous rate.

Figure 4:
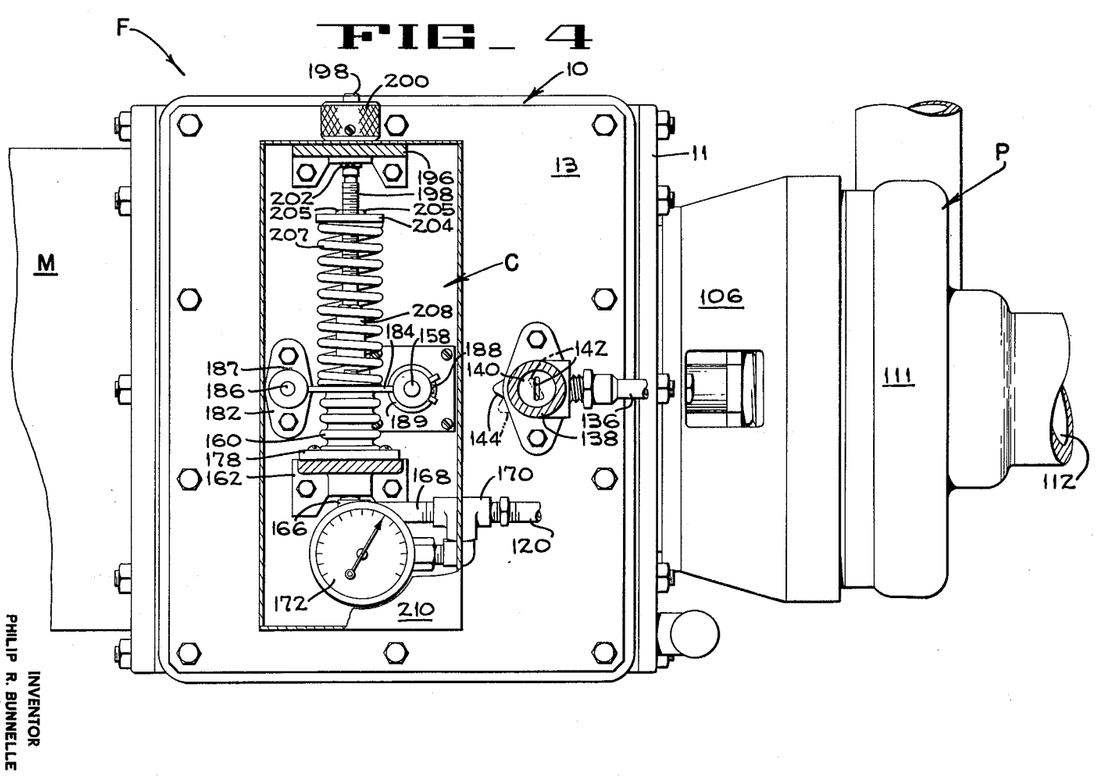
FIGURE 4 is a section taken on lines 4—4 of FIGURE 2.

As best seen in FIGURE 2, an internal charging pump discharge line 132 leads from the charging pump 122 and this internal line is connected to a terminal fitting 134 mounted in the end wall of the sump of the coupling housing. As best seen in FIGURES 2 and 4, an external line 136 forms a continuation of the charging pump discharge line 132, and the delivery end of line 136 conducts charging liquid to an orifice chamber 138 bolted to the cover plate 13 of the coupling housing.

In the form of the invention being described, an orifice plate 140, which is clamped between the orifice chamber 138 and the cover plate 13, forms part of the variable rate charging system. As is seen in FIGURES 4 and 6, the orifice plate 140 is provided with an elongated slot or orifice 142, and this slot or orifice is directly above the blunt knife edge 100 of the charging port 99.

The orifice plate 140 can be rotated to vary the sensitivity of the response. As seen in FIGURE 4 the orifice 142 is disposed so that it is parallel to the face 100a of the charging port, which is the position of minimum sensitivity. As indicated in broken lines in this figure, the orifice plate can be rotated by means of a tab 144, when the bolts that mount the orifice chamber 138 have been loosened. This divergence of the orifice 142 from the cross-wise position illustrated in FIGURE 4 progressively increases the sensitivity of the response to the control.

Mounted between the orifice plate 140 and the discharge chute 99 is a charging liquid splitter indicated generally at 150. The splitter is formed in two sections. There is a charging section 152, which is always disposed over the mouth or inlet to the charging chute. The other section is a by-pass section 154, which is always disposed so as to return or bypass charging liquid to the sump of the coupling housing. As seen in FIGURES 5 and 6, these sections of the charging liquid splitter, or divider, namely the charging section 152 and the by-pass section 154, have a common wall in the form of a splitting plate 156, which is quite thin. As will be explained in the description of the operation of the invention, in the form of the invention now being described, the position of the splitting plate 156 relative to the orifice 142 in the orifice plate 140, determines the amount of charging liquid that enters the working chamber of the coupling, as compared to the amount of the liquid that is by-passed to the sump. The spreader or splitter 150 is mounted on a control arm 158.

*Control system*

In the embodiment of the invention being described, the charging level of the working chamber of the fluid coupling is adjusted in accordance with the discharge pressure of the centrifugal pump P, driven by the coupling. Pump discharge pressure is communicated to the control unit C, by the line 120 as previously described. The function of the control system is to move the arm 158, best seen in FIG. 2, which supports the splitter unit 150, mounted between the orifice plate 140 and the charging chute or port 99. For example, referring to FIGURE 5 of the drawings, when the spreader unit 150 is positioned so that the splitter plate or wall 156 is centered beneath the orifice 142 in the orifice plate 140, the charging section 152 of the splitter or divider and the by-pass section 154 receive equal quantities of charging liquid. In FIGURE 6, the splitter wall 156 has been moved to one extreme position, wherein substantially the entire flow of charging liquid through orifice 142 will enter the charging section 152 of the splitter or divider. Although such a position is not illustrated, it will be apparent that if the spreader 150 were moved so that the splitter plate 156 were positioned at the other end of the orifice 142, then substantially all of the charging liquid would be by-passed to the sump of the fluid coupling housing, and none would enter the working chamber of the fluid coupling. In this case, the level of the flow fluid coupling would rapidly decrease, due to the constant bleeding of the orifice members 32 in the shroud surrounding the working chamber of the coupling. It is the function of the control unit C to position the spreader or splitter 150 in the manner indicated, and for the purposes described.

Basically the control unit of the embodiment of the invention being described shifts the position of the splitter 150 in one direction as the discharge from the centrifugal pump P increases, and a spring that opposes the effect of pump discharge pressure shifts the splitter 150 in the other direction, which in this case will be in a direction to increase the charging rate of the coupling. This shift occurs when the discharge pressure from the driven centrifugal pump P falls.

The pressure sensitive unit of the control is an expansible chamber in the form of a bellows 160. The bellows is mounted on a mounting block 162, bolted to the cover plate 13 of the coupling housing. As seen in FIGURE 1, the mounting block 162 is formed with a control inlet port 164, that communicates the discharge pressure of the centrifugal pump P to the bellows. An elbow 166 is threaded in the bellows mounting block 162 as seen in FIGURES 1 and 5, and a nipple 168 is threaded to the elbow 166, as seen in FIGURE 5. There is a T-connection 170 to the nipple 168, which is connected to the control pressure line 120 from the centrifugal pump P. A pressure gauge 172 is also connected to the T connection 170. One end of the bellows 160 is fastened to the mounting block 162 by means of a clamp plate 178, screwed to the bellows mounting block. The position of the free end of bellows 160 is communicated to the remainder of the control unit through a ball joint assembly, which includes a cup 180 brazed to the free end of the bellows. A spring stop 181 is mounted within the bellows, and limits the motion of the bellows in its collapsing direction, to prevent damage to the bellows.

A pivot plate mounting bracket 182 is also bolted to the cover 13, which bracket pivotally supports a splitter arm pivot plate 184. As seen in FIGURES 1 and 4, the pivot plate 184 is mounted by means of a pivot pin 186 in the bracket 182, and a set screw 187 clamps the pivot plate 184 to the pivot pin (FIGURE 4). As best seen in FIGURE 2, the outer end of the pivot plate 184 mounts the splitter arm 158 previously referred to, by means of a set screw 188. As also best seen in FIGURE 2, a flexible boot 189 is connected between the outer end of the pivot plate 184 and the cover plate 13, which boot serves as a dust seal while permitting motion of the splitter 150, as previously described.

Bolted to the mid-portion of the splitter arm pivot plate 184, is the other half 190 of the ball joint previously mentioned, and these parts are coupled by a ball 192 that is constrained between the cup 180 on the bellows 160, and the cup 190 just described. As mentioned, a control spring assembly is provided to oppose the expansion of the bellows 160, in response to discharge pressure from the centrifugal pump P, driven by the runner of the fluid coupling. In order to provide this operation, an adjusting screw mounting bracket 196 is bolted to the cover plate 13 of the coupling. An adjusting screw 198 is rotatably mounted in the bracket 196, and is axially restrained in the bracket between an adjusting knob 200 and a snap ring 202. Threadedly mounted on the adjusting screw 198 is a control spring force adjusting nut 204, which is prevented from turning by guide fingers 205 projecting downwardly from the nut (FIGURE 1) which slide along a guide bar 206, mounted on cover plate 13. The control spring is indicated at 207, and it is mounted between the spreader pivot plate 184, and the adjusting nut 204. An adjustable stop nut 208 is mounted on the end of the spring adjusting screw 198, which stop nut limits motion of the pivot plate 184 in response to the pressure of control liquid within the bellows 160. The control unit is protected by a cover plate 210 as seen in FIGURES 1 and 2.

Operation

As in other variable fill couplings, the amount of slip under a given load, and hence the speed of the output or drive shaft 34, is determined by the degree of fill of the coupling, that is, by the amount of liquid in the working chamber. In the embodiment of the invention being described, it will be assumed that the adjusting knob 200 is set to maintain discharge from the centrifugal pump P, as sensed in line 120, at a given operating pressure. When the drive motor M is started, the fill level of the coupling will usually be too small, and the output pressure of the centrifugal pump will initially be low, due to excessive slip between the runner and the impeller of the coupling. Under these conditions, the control spring 207 will probably move the splitter pivot plate 184 against the stop 181. This will bring the splitter 150 to the position shown in FIGURE 6, wherein substantially the entire flow of charging liquid delivered from the charging pump 122 through lines 132, 136 is directed to the charging section 152 of the splitter. This liquid enters port 99 of the charging chute, and is thrown by centrifugal force into the working chamber of the coupling. The rate of charging under these circumstances will exceed the rate of bleed of charging liquid from the orifice plugs 32, in the shroud, so that the fill level of the coupling will increase rapidly. This reduces the slip between the coupling parts, and increases the speed of the centrifugal pump, so that the discharge pressure of the centrifugal pump discharge quickly rises. This increase in discharge pressure expands the bellows 160 against the force of the control spring 207, and hence moves the splitter 150 relative to the orifice 142 in the orifice plate 140 in a direction which decreases the amount of charging liquid that enters the charging section 152, and increases the amount of liquid that enters the by-pass section 154 of the splitter.

Let it be assumed that the control point (selected pump discharge pressure) is provided when the splitter is centered beneath the orifice 142, as indicated in FIGURE 5 of the drawings. Should the pump discharge pressure now change, so as to exceed the set or control pressure (as determined by the adjustment of the control spring), the pressure in the bellows 160 will increase, and the splitter 150 will move in the direction to by-pass more liquid. The rate at which charging liquid enters the coupling is now reduced. Since the rate of charging liquid entry is reduced, and since the bleed rate through the orifice plugs is temporarily unchanged, the fill level in the working chamber will be reduced. This permits more slip to occur between the impeller and runner, with a corresponding decrease in the driving speed of the centrifugal pump P. If the discharge pressure were to fall below the set value, the opposite action would occur.

It is to be noted that the bleed rate of liquid out of the bleed orifices 33 increases as the level of fill increases, and decreases as the level of fill decreases. The result of this action is that the splitter 150 will assume a different position for each level of fill. This action, coupled with the effects of slip at the lower levels of fill, assist in providing linearity in the control.

Figure 7:
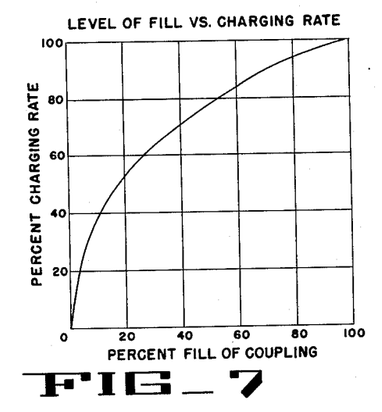
FIGURE 7 is a curve showing the level of fill plotted against charging rate.

It has been found that the controlling action is rapid and sensitive, and that under varying demands, the regulation, which is the difference between the actual pressure delivered by the centrifugal pump, and the selected pressure (sometimes referred to as "droop" in this art) is quite small. The relatively light weight, quick acting nature of the control and splitter units is responsible for this rapid and sensitive action, under varying loads or demands. The curve of FIGURE 7 gives the percent fill of the coupling for each percent charging rate. The zero percent charging rate would be the condition wherein all of the charging liquid is directed into the bypass splitter section 154, whereas the condition of 100% charging rate is that illustrated in FIGURE 6.

Figure 8:
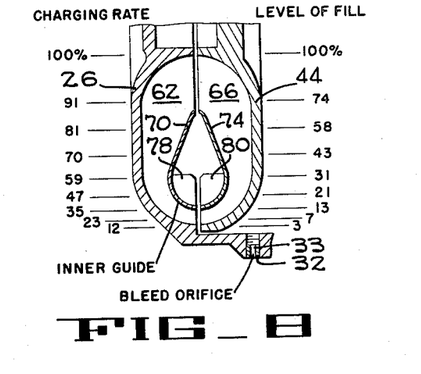
FIGURE 8 is a diagram showing the relation of percent charging rate to level of fill of the coupling.
Figures 9, 10:
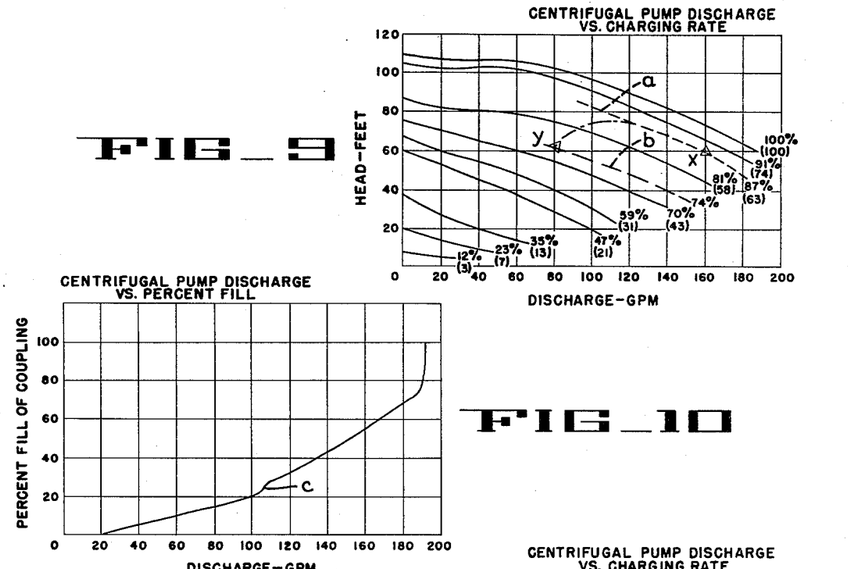
FIGURE 9 is a pump characteristic curve.
FIGURE 10 is a curve plotting centrifugal pump discharge against fill level.

The diagram of FIGURE 8 provides the same information in different form, in that it indicates schematically the level of fill at various charging rates. The curves of FIGURE 9 give centrifugal pump pressure in terms of feet of head, at various discharge rates in terms of gallons per minute. Each curve of FIGURE 9 represents a different percent charging rate, or its equivalent percent of fill (in parenthesis). The nature of the response of the system to action of the control is given by one example in the graph of FIGURE 9. For example, assume that the centrifugal pump P is operating at point "x" on the curve, which corresponds to the centrifugal pump discharge of 160 gallons per minute, at 60 ft. of head (pressure), with an 87% charging rate. Suppose now that the demand on the centrifugal pump P drops to 80 gallons per minute. Under these circumstances the centrifugal pump will be overdriven, and the control must reduce the level of fill of the coupling. The pump discharge pressure, and hence the pressure within the bellows 160 will momentarily rise past the set, or control pressure, and the control spring 207 will be further compressed. This will move the splitter 150 to direct more of the charging liquid into the by-pass section 154. This rapidly reduces the charging rate, and increases coupling slip. Returning to the curves of FIGURE 9, as previously mentioned the unit was initially operating at point "x," which lies on a curve "a" representing the 87% charging rate. The centrifugal pump discharge rate, in response to the reduced demand, drops along a path generally like that shown in broken lines, reducing pump discharge in terms of gallons per minute to a value indicated at point "y." This point falls on the operating curve indicated at "b," which represents a new charging rate of 74%. There will be a slight increase in the pressure (head) of operation at the 80 gallon discharge rate, over the pressure delivered at 160 g.p.m. This difference, which might represent a head difference of 2 or 3 feet, occurs because of control spring compression. In other words the slight motion of the bellows on pivot plate 184, in compressing the control spring 207, results in a slightly higher force being exerted by the spring against the pivot plate 184 in the new control position. This calls for a slightly higher pressure in bellows 160 to balance the spring in its new position.

The charging pump 122 can be designed to deliver more liquid than is required to completely fill the coupling at maximum demands, which provides rapid response under high demand conditions of operation.

Figures 11, 12:
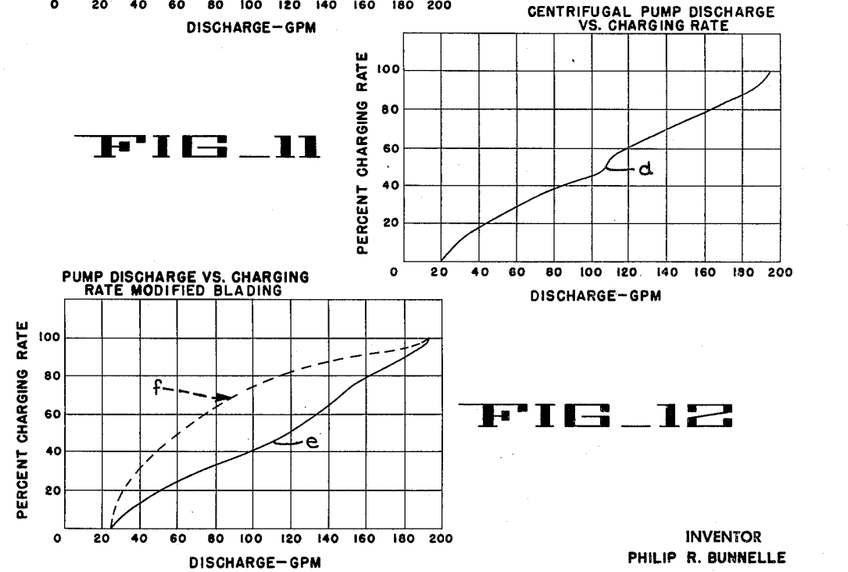
FIGURE 11 is a curve plotting centrifugal pump discharge against percent rate.
FIGURE 12 is a curve similar to that of FIGURE 11 showing operation when auxiliary blades have been added to the coupling.

The curve of FIGURE 10 displays the discharge of the centrifugal pump P in gallons per minute, for each percent fill of the coupling in a system that provides a friction head only. It will be noted that there is a slight hump in the curve at point "c," and that at higher discharge rates the curve is not at all linear. This indicates that control of the coupling in terms of percent fill, would not be a satisfactory mode of operation. However, as seen in the curve of FIGURE 11, the response curve in terms of percent charging rate against centrifugal pump discharge rate, is relatively linear, so that control in terms of the percent charging rate provides a simple and effective mode. The slight hump indicated at "d" in FIG. 11, remains, but this hump appears only in couplings with the inner guides 74, 76, but which lack the auxiliary blades 78 and 80. The curve e of FIGURE 12 is like that of FIGURE 11, but represents the action of a coupling having both the auxiliary inner guides 74, 76 and the auxiliary blades 78, 80 previously described. These auxiliary units smooth out the response and action of the coupling, when the percent of fill in the coupling drops below 30 percent, and hence they improve control of the coupling in this zone.

Modified form

Figure 13:
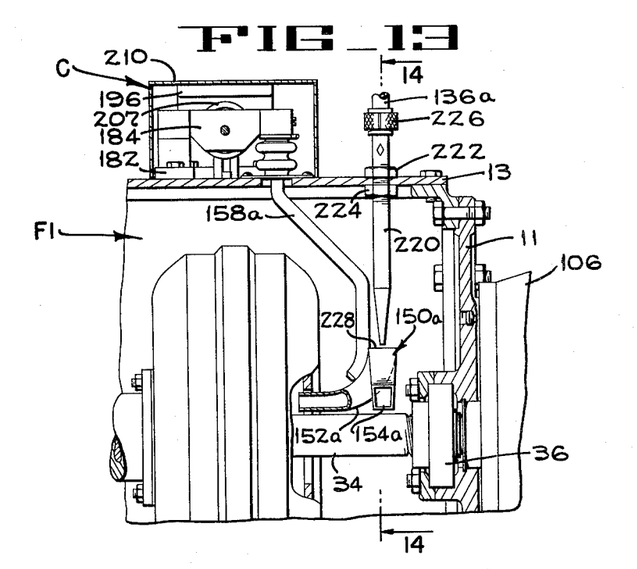
FIGURE 13 is a fragmentary vertical section of a modified form of coupling.
Figure 14:
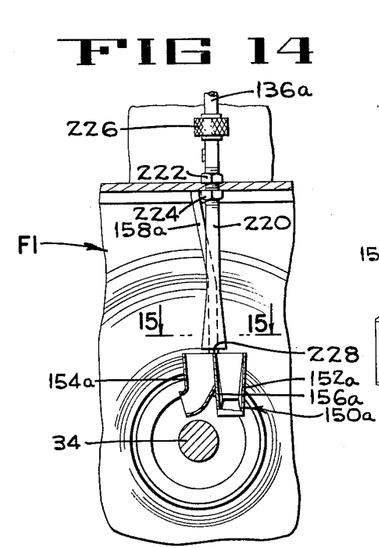
FIGURE 14 is a section taken on lines 14—14 of FIGURE 13.
Figure 15:
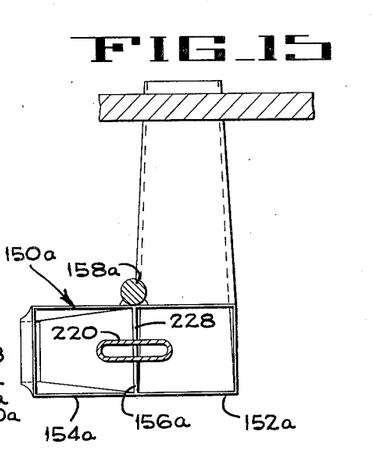
FIGURE 15 is a section taken on lines 15—15 of FIGURE 14.

FIGURES 13–15 show a modified form F1 of a coupling that embodies the present invention. The charging system of this embodiment of the invention has essentially the mode of operation as that previously described. In this form, the splitter 150a is arranged so that no separate fixed charging chute is required. The charging section 152a of the splitter is curved, as best seen in FIGURE 13, to introduce the charging liquid directly into the hub portion of the impeller, whereupon the charging liquid is forced into the working chamber of the coupling by centrifugal force, as before. The bypass section 154a of the splitter is curved, to direct the liquid it receives clear of the hub portion of the impeller, and into the sump. The splitter 150a is mounted on a control arm 158a which is operated in the manner previously described. However, instead of moving the splitter under an orifice plate in the form of the invention now being described the splitter moves under a flattened nozzle 220, the mouth of which is shaped to serve the same function as the orifice 142, in the orifice plate 140 previously described. The nozzle 220 is mounted in the cover 13 of the coupling housing by nuts 222, 224. It is connected to a charging liquid supply line 136a, leading from the charging pump by a swivel joint 226. In order to vary the sensitivity of the coupling control, nut 222 and swivel 226 are loosened, and the nozzle 220 is rotated to the desired angle. In this form of the invention the splitter wall or plate 156a between the splitter sections is formed with a knife edge 228 to increase the precision of control.

Second modified form

Figure 16:
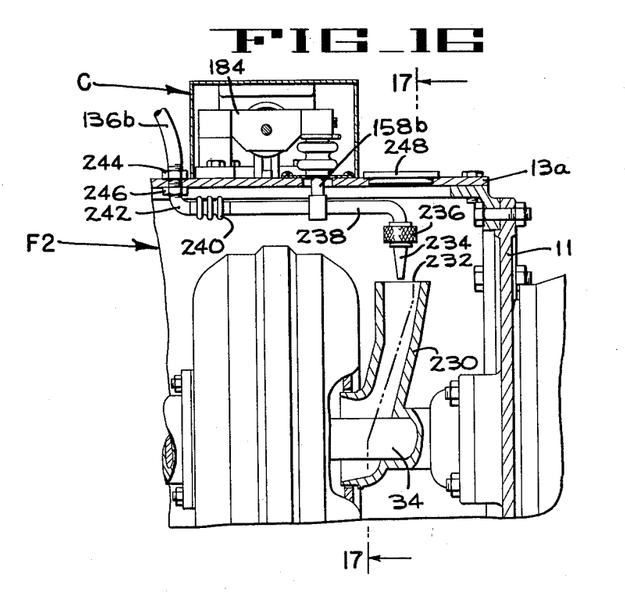
FIGURE 16 is a fragmentary vertical section of another modified form of coupling.
Figure 17:
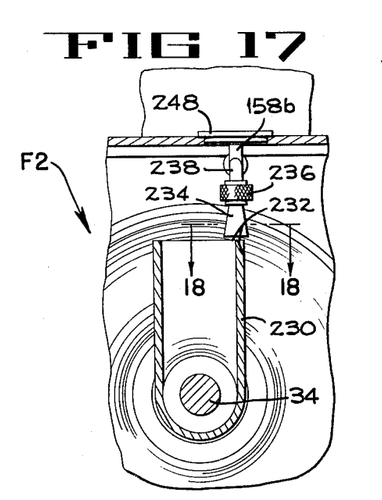
FIGURE 17 is a fragmentary section taken on lines 17—17 of FIGURE 16.
Figure 18:
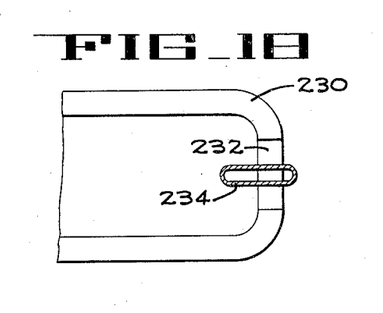
FIGURE 18 is a fragmentary section taken on lines 18—18 of FIGURE 17.

The coupling unit F2 of FIGURES 16–18 is fitted with another form of variable charging rate device. In this form of the invention, no separate splitter or spreader for the charging liquid is required. The function of the splitter or spreader is now performed by the charging chute. The charging chute 230 of this modification is formed with a knife edge 232 which provides the charging liquid splitting function.

In this modification, a flat nozzle 234 is moved back and forth across the knife edge 232 of the charging chute 230. The nozzle is adjustably mounted by means of a swivel joint 236 that connects it to a pipe 238. Pipe 238 is mounted on the mounting rod 158b, operated by the control unit C, which unit has the pivot plate 184 and other parts like those previously described. Pipe 238 connects from a flexible coupling 240 to an elbow 242. The flexible coupling 240 permits the control unit to shift the nozzle 234 relative to the knife edge 232 of the charging chute. Elbow 242 is mounted on the cover plate 13a of the unit by nuts 244, 246, which also provide the connection to a line 136b, which receives charging liquid from the charging pump within the coupling housing, as before. A hand hole cover 248 is provided in the cover plate 13a of the coupling housing to provide access to the swivel joint 236, for adjusting the angularity of the nozzle 234. This varies the response sensitivity in the manner previously described. The operation of this mode of the invention is believed to be apparent, and in fact corresponds to the operation of the form of the invention of FIGURES 1–5 described in detail.

Modified nozzle plates

Figure 19:
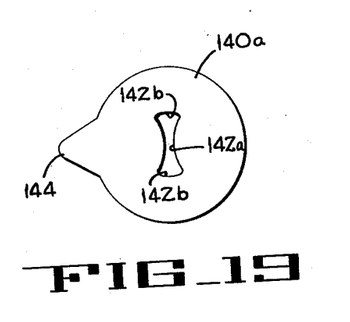
FIGURES 19 and 20 show modified, variable rate orifice plates.

In the form of the invention first described, a nozzle plate 140 was provided with an orifice slot 142 having parallel side walls. This provides a uniform response throughout the range of operation. FIGURE 19 shows a modified nozzle plate 140a, having an orifice or slot 142a of generally hour glass shape. The ends 142b of the slot are larger than the center, or waist section thereof. This configuration of the orifice or slot 142a provides rapid response when the error signal is large, that is, when either end 142b of the slot in the orifice plate overlies the splitter plate or wall 156, of the splitter 150. When the coupling is operated at the selected or control pressure, the narrow central portion of the slot 142a will be effective, so that the rate of correction of the error in this zone of operation is much slower than when the error is large, as previously described.

Figure 20:
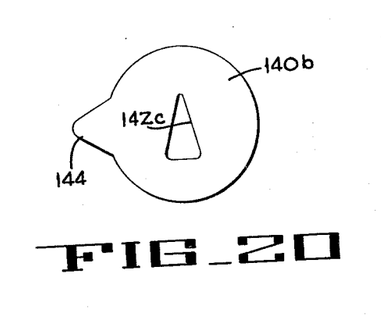

FIGURE 20 shows another form of orifice plate. Here an orifice plate 140b has a triangular orifice slot 142c disposed so that the orifice slot is wide at one end and narrow at the other, and with a transition zone therebetween. This configuration of the orifice slot will be employed when it is desired to correct the error more rapidly at one extreme of the operating range than at the other. The orifice is narrow where change is rapid, and widens where response is sluggish as, for example, when controlling pneumatically. This improves stability by narrowing it in the range where stability is poorest. Furthermore, an orifice plate like that of 140b of FIGURE 20 could be used for applications wherein excess pressures might have more serious consequences than low pressures, so that the wide end of the orifice 142c would be in operation when the discharge pressure exceeds the control, or selected value. Such an orifice could be used to provide a response curve similar to curve "f" of FIG. 12. The nozzle 234, FIGS. 16–18, can be shaped to accomplish the results obtained by orifice plates 140a (FIG. 19), and 140b (FIG. 20).

Modified form of coupling shroud

Figure 21:
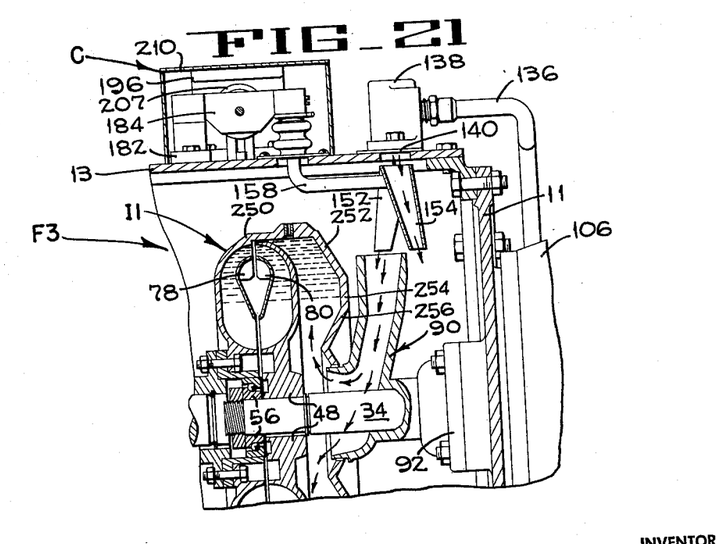
FIGURE 21 is a fragmentary section showing a modified form of coupling with a variable volume shroud.

FIGURE 21 illustrates a single runner coupling F3, wherein the correction rate at various levels of fill is varied by varying the configuration of the shroud. In this form of the invention, the shroud 250 on the impeller I1 has a varying cross sectional configuration, that produces varying cross sectional areas. For example, the cross sectional area between the shroud 250 and the runner wall is increased as the fill level increases from zero, by an expanding shroud section 252. It is held substantially constant during the mid range of operation, by a radial shroud section 254, and it decreases again when the fill level is high, because of the shape of a second conical shroud section 256. Since for a given rate of charging liquid delivery the rate of fill is inversely proportional to the cross sectional area between the shroud and the outer wall of the runner, this configuration of the shroud gives a correction rate that varies at different operating levels. With the particular shroud configuration illustrated, when the fill level is at the central shroud section 254, the correction rate is constant, but the correction rate will be rapid at high fill levels when the shroud section 256 comes into play, and will also be rapid at low fill levels, when shroud section 252 is effective.

Although the coupling of the present invention is particularly effective in driving centrifugal pumps, in the broader aspects of the invention, other units may be driven by the coupling. The control unit as illustrated is responsive to the discharge pressure of a centrifugal pump, but other modes of control are within the scope of the invention. The control pressure within the bellows 160 may be varied in accordance with standards other than the discharge pressure of a pump, such as by differential pressure control, constant speed control, constant level control in a tank, reservoir, or the like.

Having completed detailed description of the invention, I claim:

1. A variable fill liquid coupling comprising a housing, a source of liquid, a driving impeller rotatably mounted in said housing, a driven runner rotatably mounted in said housing in liquid coupling relation with said impeller, shroud means for forming an active liquid chamber within said impeller and runner, means for centrifugally bleeding said active liquid chamber, liquid charging port means inside said housing for directing liquid to said chamber, and control means for admitting charging liquid to said charging port means; said control means comprising liquid discharge orifice means in said housing, means for supplying liquid to said orifice means, charging liquid dividing means inside said housing associated with said charging port means and with said orifice means for dividing the charging liquid into two streams and causing one stream of the charging liquid to enter said liquid charging port means and the remainder to return to said liquid source, and means on said housing for operating said charging liquid dividing means for varying the division of charging liquid between said liquid charging port means and the liquid source.

2. A variable filling liquid coupling comprising a housing, a source of liquid, a driving impeller rotatably mounted in said housing, a driven runner rotatably mounted in said housing in liquid coupling relation with said impeller, shroud means for forming an active liquid chamber within said impeller and runner, means for centrifugally bleeding said active liquid chamber, a main pump driven by said runner, liquid charging port means inside said housing for directing liquid to said chamber, and control means for admitting charging liquid to said charging port means; said control means comprising liquid discharge orifice means inside said housing, means for supplying liquid to said orifice means, charging liquid dividing means above said charging port means and beneath said orifice means for dividing the charging liquid into two streams and causing one stream of the charging liquid to enter said liquid charging port means and the remainder to return to said liquid source, and means on said housing for operating said charging liquid dividing means for varying the division of charging liquid between said liquid charging port means and the liquid source, in response to the discharge from said main pump.

3. A variable filling liquid coupling comprising a housing having a liquid sump, a driving impeller rotatably mounted in said housing, a driven runner rotatably mounted in said housing in liquid coupling relation with said impeller, shroud means for forming an active liquid chamber within said impeller and runner, means for centrifugally bleeding said active liquid chamber, liquid charging port means for directing liquid to said chamber, and control means for admitting charging liquid to said charging port means; said control means comprising liquid discharge orifice means in said housing, a pump receiving liquid from said sump and driven in accordance with impeller speed for supplying liquid to said discharge orifice means, charging liquid dividing means above said charging port means and beneath said orifice means for dividing the charging liquid into two streams and causing one stream of the charging liquid to enter said liquid charging port means and the remainder to flow into said housing sump, and means on said housing for operating said charging liquid dividing means for varying the division of charging liquid between said liquid charging port means and the sump.

4. A variable filling liquid coupling comprising a housing, a liquid source, a driving impeller rotatably mounted in said housing, a driven runner rotatably mounted in said housing in liquid coupling relation with said impeller, shroud means for forming an active liquid chamber within said impeller and runner, means for centrifugally bleeding said active liquid chamber, liquid charging port means for directing liquid to said chamber, and control means for admitting charging liquid to said charging port means; said control means comprising fixed liquid discharge orifice means in said housing, means for supplying liquid to said orifice means, charging liquid dividing means beneath said orifice means for dividing the charging liquid into two streams and causing one stream of the charging liquid to enter said liquid charging port means and the remainder to return to said liquid source, and means on said housing for shifting said charging liquid dividing means for varying the division of charging liquid between said liquid charging port means and the liquid source.

5. A variable fill liquid coupling comprising a housing, a driving impeller rotatably mounted in said housing, a driven runner, a shaft rotatably mounting said runner in said housing in liquid coupling relation with said impeller, shroud means rotating with said impeller and surrounding said runner for forming an active liquid chamber within said impeller and runner, means for centrifugally bleeding said active liquid chamber, said impeller having a radially inner hub portion forming a charging liquid admission mouth surrounding said shaft, liquid charging port means fixedly mounted inside said housing for directing liquid to said chamber admission mouth, said port means extending upwardly from said hub portion of the impeller, and control means for admitting charging liquid to said charging port means; said control means comprising liquid discharge means in said housing having an elongated orifice, means for supplying liquid to said orifice means, charging liquid dividing means beneath said orifice and above said charging port means, said liquid dividing means having one section for directing charging liquid to said liquid charging port means and another section for bypassing charging liquid, said liquid dividing means having a charging liquid splitting wall common to both of said sections, and means for moving said liquid splitting wall across said orifice for varying the rate of charging liquid delivery to said liquid charging port means.

6. A variable fill liquid coupling comprising a housing having a liquid sump, a driving impeller rotatably mounted in said housing, a driven runner rotatably mounted in said housing in liquid coupling relation with said impeller, shroud means for forming an active liquid chamber within said impeller and runner, means for centrifugally bleeding said active liquid chamber, liquid charging port means fixed inside said housing for directing liquid to said chamber, liquid discharge orifice means mounted in said housing and formed with an elongated orifice, means for supplying liquid to said orifice means, charging liquid dividing means having a charging section for delivering liquid to said charging port means and a bypass section for returning liquid to said sump, said liquid dividing means having a liquid splitter between its sections disposed beneath said orifice for causing a portion of the charging liquid to enter said charging port means and the remainder of the liquid to be returned to said housing sump, and control means for shifting said charging liquid splitter relative to said orifice for varying the division of charging liquid between said liquid charging port means and the sump.

7. A variable filling liquid coupling comprising a housing having a liquid sump, a driving impeller rotatably mounted in said housing, a driven runner rotatably mounted in said housing in liquid coupling relation with said impeller, shroud means for forming an active liquid chamber within said impeller and runner, means for centrifugally bleeding said active liquid chamber, liquid charging port means for directing liquid to said chamber, liquid discharge orifice means mounted in said housing and formed with an elongated orifice, means for supplying liquid to said orifice means, charging liquid dividing means inside said housing and having a charging section for delivering liquid to said charging port means and a by-pass section for returning liquid to said sump, said liquid dividing means having a liquid splitter between its sections disposed beneath said orifice means for causing a portion of the charging liquid to enter said charging port means and the remainder of the liquid to be returned to said housing sump, and control means for shifting said charging liquid splitter relative to said orifice means for varying the division of charging liquid between said liquid charging port means and the sump, said orifice means being adjustably mounted for varying the extent thereof in the direction of shifting motion of said charging liquid splitter for varying control sensitivity.

8. A variable filling liquid coupling comprising a housing, a liquid source, a driving impeller rotatably mounted in said housing, a driven runner rotatably mounted in said housing in liquid coupling relation with said impeller, shroud means rotating with said impeller and surrounding said runner for forming an active liquid chamber within said impeller and runner, means for centrifugally bleeding said active liquid chamber, said impeller having a hub portion forming liquid charging port means for directing liquid to said chamber, a charging nozzle depending from said housing and having elongated liquid discharge orifice means, means for supplying liquid to said charging nozzle, charging liquid dividing means having a charging section for delivering liquid to said charging port means and a by-pass section for returning liquid to said liquid source, said liquid dividing means having a liquid splitter between its sections disposed beneath said nozzle orifice means for causing a portion of the charging liquid to enter said charging port means and the remainder of the charging liquid to be returned to said liquid source, and control means for shifting said charging liquid dividing means relative to said orifice means for varying the division of charging liquid between said liquor charging port means and the liquid source.

9. A variable filling liquid coupling comprising a housing having a liquid sump, a driving impeller rotatably mounted in said housing, a driven runner rotatably mounted in said housing in liquid coupling relation with said impeller, shroud means rotating with said impeller and surrounding said runner for forming an active liquid chamber within said impeller and runner, means for centrifugally bleeding said active liquid chamber, said impeller having a hub portion forming liquid charging port means for directing liquid to said chamber, a charging nozzle depending from said housing and having elongated liquid discharge orifice means, means for supplying liquid to said charging nozzle, charging liquid dividing means having a charging section for delivering liquid to said charging port means and a by-pass section for returning liquid to said sump, said liquid dividing means having a liquid splitter between its sections disposed beneath said nozzle orifice means for causing a portion of the charging liquid to enter said charging port means and the remainder of the charging liquid to be returned to said housing sump, and control means for shifting said charging liquid dividing means relative to said orifice means for varying the division of charging liquid between said liquid charging port means and the sump, said nozzle being rotatably mounted on said housing for varying control sensitivity.

10. The apparatus of claim 5 wherein said elongated orifice is of generally hour glass shape, to increase the rate of error response at maximum errors.

11. The apparatus of claim 5 wherein said elongated orifice is wider at one end than the other.

12. A variable fill liquid coupling comprising a housing, a driving impeller rotatably mounted in said housing, a driven runner rotatably mounted in said housing in liquid coupling relation with said impeller, shroud means rotating with said impeller and surrounding said runner for forming an active liquid chamber within said impeller and runner, means for centrifugally bleeding said active liquid chamber, liquid charging port means for directing liquid to said chamber, and control means for admitting charging liquid to said charging port means; said control means comprising liquid discharge orifice means in an upper part of said housing, means for supplying liquid to said orifice means, charging liquid dividing means above said charging port means and beneath said orifice means for dividing the charging liquid into two streams and causing one stream of the charging liquid to enter said liquid charging port means and to bypass the remainder, and means for operating said charging liquid dividing means for varying the rate of supply of charging liquid to said liquid charging port means.

13. A variable fill liquid coupling comprising a housing, a driving impeller rotatably mounted in said housing, a driven runner rotatably mounted in said housing in liquid coupling relation with said impeller, a shroud rotating with said impeller and for forming an active liquid chamber within said impeller and runner means for centrifugally bleeding said active liquid chamber, liquid charging port means for directing liquid to said chamber, and control means for admitting charging liquid to said charging port means; said control means comprising liquid discharge orifice means in said housing, means for supplying liquid to said orifice means charging liquid dividing means above said charging port means and beneath said orifice means for causing a portion of the charging liquid to enter said liquid charging port means and to bypass the remainder, and means for operating said charging liquid dividing means for varying the rate of supply of charging liquid to said liquid charging port means, said shroud having an extension portion surrounding the outside wall of said runner, said shroud extension portion and the outside wall of said runner cooperating to provide an auxiliary fill chamber of changing cross sectional area at various levels of fill.

14. A variable fill liquid coupling comprising a housing, a driving impeller element rotatably mounted in said housing, a driven runner element rotatably mounted in said housing in liquid coupling relation with said impeller, shroud means rotating with one of said elements and surrounding the other element for forming an active liquid chamber within said impeller and runner, means for centrifugally bleeding said active liquid chamber, one of said elements having a radially inner hub portion forming a charging liquid admission mouth, a liquid charging port fixedly mounted inside said housing for directing liquid to said chamber, said port extending upwardly from said hub portion of said one element, said port having a liquid dividing wall, and control means for admitting charging liquid to said charging port means; said control means comprising a movable nozzle having an elongated orifice disposed above said charging port, means for supplying liquid to said nozzle, and means for shifting said nozzle across said liquid dividing wall.

15. A variable filling liquid coupling comprising a housing, a liquid source, a driving impeller rotatably mounted in said housing, a driven runner rotatably mounted in said housing in liquid coupling relation with said impeller, shroud means for forming an active liquid chamber within said impeller and runner, means for centrifugally bleeding said active liquid chamber, a centrifugal pump driven by said runner, liquid charging port means mounted inside said housing for directing liquid to said chamber, and control means for admitting charging liquid to said charging port means; said control means comprising a liquid discharge orifice in said housing, means for supplying liquid to said orifice, charging liquid dividing means above said charging port means and below said orifice for causing a portion of the charging liquid to enter said liquid charging port means and the remainder to flow into said housing sump, and means for operating said charging liquid dividing means for varying the division of charging liquid between said liquid charging port and the liquid source, in response to the discharge from said centrifugal pump, said operating means comprising a variable volume liquid chamber having a movable wall, a line between the discharge of said centrifugal pump and said chamber tending to expand the chamber in response to an increase in pump discharge pressure, adjustable spring means for opposing expansion of said chamber, and means connecting said charging liquid dividing means to said movable chamber wall.

16. A variable fill liquid coupling comprising a housing, a source of liquid, a driving impeller element rotatably mounted in said housing, a driven runner element rotatably mounted in said housing in liquid coupling relation with said impeller element, shroud means rotating with one of said elements and surrounding the other of said elements for forming an active liquid chamber within said impeller and runner elements, means for centrifugally bleeding said active liquid chamber, liquid charging port means inside said housing for directing liquid to said chamber, and control means for admitting charging liquid to said charging port means; said control means comprising liquid discharge orifice means in an upper portion of said housing; means for supplying liquid to said orifice means, charging liquid dividing means above said charging port means and beneath said orifice means for causing a portion of the charging liquid to enter said liquid charging port means and the remainder to return to said liquid source, and means on said housing for operating said charging liquid dividing means for varying the division of charging liquid between said liquid charging port means and the liquid source.

17. A variable fill liquid coupling comprising a housing, a driving impeller rotatably mounted in said housing, a driven runner rotatably mounted in said housing in liquid coupling relation with said impeller, shroud means for forming an active liquid chamber within said impeller and runner, means for centrifugally bleeding said active liquid chamber, a source of charging liquid, means forming an elongated orifice for transforming charging liquid received from said liquid source into a downwardly flowing, flattened stream of liquid, means inside said housing and disposed below said elongated orifice for admitting charging liquid from said flattened stream of liquid into said active liquid chamber, means inside said housing for dividing said flattened stream of liquid into two separate streams, means for causing one of said separate streams of liquid to be admitted to said active liquid chamber and for causing the other of said separate streams of liquid to return to said liquid source, and control means on said housing for varying the volume of said one separate stream of liquid that is admitted to said active liquid chamber, while returning the resulting volume of said other separate stream of liquid back to said liquid source.

References Cited by the Examiner
UNITED STATES PATENTS

| | | | |
|---|---|---|---|
| 876,687 | 1/08 | Brown | 137—612 |
| 1,082,287 | 12/13 | Schaffer et al. | 137—611 X |
| 2,223,715 | 12/40 | Berger | 60—54 |
| 2,372,326 | 3/45 | Hewitt | 60—54 X |
| 2,436,034 | 2/48 | Buehler | 60—54 X |
| 2,508,762 | 5/50 | Lapple | 132—262 X |
| 2,518,574 | 8/50 | Skopecek | 137—612 |

JULIUS E. WEST, *Primary Examiner.*